United States Patent [19]

Nakano et al.

[11] Patent Number: 4,783,658
[45] Date of Patent: Nov. 8, 1988

[54] METHOD AND SYSTEM FOR DETECTING ENCODED RADIO SIGNALS

[75] Inventors: Kinichiro Nakano; Mikio Takeuchi, both of Zama; Takahisa Tomoda, Sagamihara; Motoki Hirano, Yokohama, all of Japan

[73] Assignee: Nissan Motor Company, Limited, Yokohama, Japan

[21] Appl. No.: 895,369

[22] Filed: Aug. 11, 1986

[30] Foreign Application Priority Data

Aug. 12, 1985 [JP] Japan ................. 60-177293

[51] Int. Cl.$^4$ .................. H04Q 7/02; H04B 17/00
[52] U.S. Cl. .................. 340/825.540; 340/825.770; 455/63; 375/76
[58] Field of Search .......... 340/825.54, 825.77, 340/696; 455/63, 136, 245, 246, 254, 256, 226; 375/98, 34, 57, 58, 76

[56] References Cited

U.S. PATENT DOCUMENTS

| | | | |
|---|---|---|---|
| 3,196,440 | 7/1965 | Weinstein | 340/696 |
| 4,309,674 | 1/1982 | Owen | 455/63 |
| 4,479,255 | 10/1984 | Geesen et al. | 455/246 |
| 4,554,542 | 11/1985 | Dolikian | 340/825.77 |
| 4,619,002 | 10/1986 | Thro | 375/98 |

Primary Examiner—Donald J. Yusko
Attorney, Agent, or Firm—Foley & Lardner, Schwartz, Jeffery, Schwaab, Mack, Blumenthal & Evans

[57] ABSTRACT

A method for detecting an encoded radio signal involves comparing the received signal amplitude with a predetermined threshold amplitude. The difference between the received signal-component amplitude and the noise-component amplitude is derived and used to adjust the threshold amplitude. By adjustng the threshold amplitude depending upon the difference between the signal-component amplitude and the noise-component amplitude, mis-detection which could occur otherwise when the reception amplitude of the noise component is relatively high or the reception amplitude of the signal component is relatively low can be successfully and satisfactorily avoided. In order to implement the foregoing process, an encoded radio signal detecting system comprises detecting means separately detecting the signal-component amplitude and the noise-component amplitude, arithmetic means for deriving the difference between the received signal-component amplitude and the noise-component amplitude and deriving a value proportional to the derived difference, which derived value serves as a threshold amplitude, and comparator means for comparing the received signal amplitude with the threshold amplitude, thereby detecting the presence or absence of encoded radio signals.

13 Claims, 6 Drawing Sheets

METHOD AND SYSTEM FOR DETECTING ENCODED RADIO SIGNALS

BACKGROUND OF THE INVENTIOn

The present invention relates generally to a method and system for detecting an encoded radio signal containing a digital code component. More specifically, the invention relates to a method and system for detecting digitally encoded radio signals. Further specifically, the invention relates to a method and system for detecting digitally encoded radio signals transmitted between a pocket-portable transmitter and a vehicle-mounted controller in an automotive keyless entry system for operating vehicle devices, such as a door lock mechanism, a trunk lid opener and so forth, without mechanical key operation or manual input of a preset code.

Recently, a novel keyless entry system for automotive vehicles has been proposed and put on the market. This system does not require mechanical key operation or manual entry of a preset code to operate various vehicle devices, such as the vehicle door lock, the trunk lid opener and so forth. In this keyless entry system, a pocket-portable transmitter is used as a source of a preset code signal. The transmitter generates radio waves carrying the preset code and transmits the radio waves to a controller mounted on a vheicle. The controller receives and decodes the radio waves. If the decoded code matches a preset code in the controller, the controller sends a control signal to the vehicle device to be operated.

In this keyless entry system, it is preferable in view of battery power consumption to employ a passive transmitter which generates and transmits the preset code-carrying radio wave in response to some trigger. In the proposed keyless entry system, a controller in the vehicle, which utilizes the power of a vehicular battery, is thus designed to generate and transmit a demand radio signal to the transmitter to trigger the latter. This demand radio signal may be a digitally encoded radio signal generated in response to manual operation of a manual switch mounted on the outside of the vehicle body, such as on an outside door handle, outside door handle escutcheon, a trunk lid ornament and so forth.

To detect the demand radio signal from the controller, the transmitter operates in a stand-by state and must somehow distinguish the demand signal from the controller from radio noise. Generally, the presence of the demand signal is detected when the received radio amplitude exceeds a predetermined threshold amplitude. However, if the received signal amplitude is simply compared with the predetermined threshold amplitude, mis-detection can easily occur at times of relatively intense noise or insufficient strong encoded radio signals, i.e. the demand signal.

SUMMARY OF THE INVENTION

Therefore, it is a principle object of the present invention to provide a method and system for detecting encoded radio signals accurately despite variation in amplitude of radio noise and/or the encoded radio signal.

Another object of the invention is to provide a method and system for detecting encoded radio signals employing a threshold amplitude which varies with the difference between the encoded radio signal amplitude and the noise amplitude.

A further object of the invention is to provide a digitally encoded radio signal detector for use in a radio code signal transmitter in an automotive keyless entry system.

A still further object of the invention is to provide a digitally encoded radio signal detector in a radio code signal transmitter which can accurately distinguish the encoded radio signal from noise even as the amplitude of the encoded radio signal and/or the noises vary.

In order to accomplish the above-mentioned and other objects, in a method for detecting a encoded radio signal, according to the present invention, a received signal amplitude is compared with a predetermined threshold amplitude. The difference between the received signal component amplitude and noise component amplitude is derived and used to adjust the threshold amplitude. The threshold amplitude is adjusted on the basis of the derived difference.

By adjusting the threshold amplitude depending upon the difference between the signal component amplitude and the noise component amplitude, mis-detection which would occur otherwise when the reception amplitude of the noise component is substantially high or the reception amplitude of the signal component is relative low, can be successfully and satisfactorily avoided.

On the other hand, an encoded radio signal detecting system, according to the present invention, comprises detecting means separately detecting the amplitudes of signal components and noise components of received radio, arithmetic means for deriving the difference between the received signal-component amplitude and the noise-component amplitude, and deriving a value proportional to the derived difference, which derived value serves as a threshold amplitude, and comparator means for comparing the received signal amplitude with the threshold amplitude to detect the encoded radio signal.

According to one aspect of the invention, an encoded radio signal detecting system comprises first means for receiving an encoded radio signal to produce an analog signal having a signal amplitude variable depending upon amplitude of the received signals, second means for detecting amplitude of a signal component and noise component in the analog signal for deriving a difference of amplitudes of the signal component and the noise components, third means for deriving a threshold amplitude based on the difference of amplitudes of the signal component and the noise component for outputting a threshold indicative signal, and fourth means for comparing the analog signal value with the threshold indicative signal value for detecting presence and absence of the encoded radio signal.

The third means holds the analog signal value while the encoded radio signal is absent as a noise component indicative signal value and holds the analog signal value while radio signal is present as a signal component indicative value for deriving the difference of the amplitudes of the signal component and the noise component.

In the preferred process to be implemented by the encoded radio signal detecting system according to the one aspect of the invention, the threshold amplitude is determined relative to the signal component indicative signal value and the difference, at a value smaller than the signal component indicative signal value in a rate proportional to the difference of the amplitudes of the signal component and the noise component.

Preferably, the fourth means is cooperated with the third means to feed an output indicative of absence or presence of the encoded radio signal, and the third means is responsive to the absense indicative output from the fourth means for holding the analog signal value as the noise component indicative signal and presence indicative output to perform the threshold delivation for outputting the threshold value based on the previously held noise component indicative signal and the currently held signal component indicative signal.

According to another apsect of the invention, a method for detecting an encoded radio signal comprising the steps of:

receiving radio signals for generating an analog signal having a value variable depending upon the received radio signal;

detecting signal component amplitude and noise component amplitude in the received signal and deriving a difference between the signal component and noise component amplitudes;

deriving a threshold value based on the difference between the signal component and the noise component amplitudes; and comparing the analog signal value with the threshold value for detecting presence and absence of the encoded radio signal for producing a binary signal variable of the values between HIGH and LOW depending upon presence and absence of the encoded radio signal.

The signal component amplitude and the noise component amplitude detecting step is performed by holding the noise component amplitude while the binary signal representative of absence of the encoded radio signal is output and holding the signal component amplitude while the binary signal representative of presence of the encoded radio signal is output. The threshold value is determined at a value smaller than the signal component amplitude in a variable value variable in proportion to the difference of the signal component amplitude and the noise component amplitude.

According to a further aspect of the invention a keyless entry system for an automotive vehicle device for actuating the vehicle device, comprises an electrical actuator connected to the vehicle device and responsive to a control signal to operate the vehicle device to a position ordered by the control signal, a manual switch, a transmitter transmitting a radio code signal indicative of a unique code which identifies the transmitter, a detector incorporated in the radio code signal transmitter for detecting a radio demand signal for activating the transmitter to transmit the radio code signal the detector comparing a received signal with a predetermined threshold which is variable depending upon a difference of a signal component and a noise component in the received signals and outputting an activation signal for activating the radio signal transmitter when the received signal amplitude is higher than the threshold amplitude, and a controller responsive to manual operation of the manual switch to generate a radio demand signal to activate the transmitter, to transmit the radio demand signal to the transmitter, to receive the unique code indicative radio code signal from the transmitter, to compare the unique code with a preset code, and to generate the control signal when the unique code matches the preset code.

DESCRIPTION OF THE PREFERRED EMBODIMENTS

Figure 1:
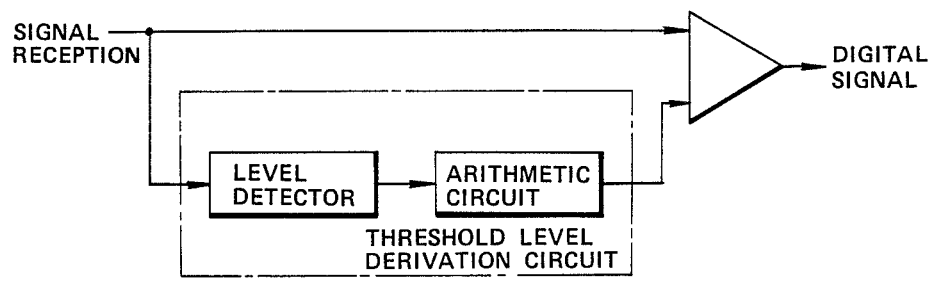
FIG. 1 is a schematic block diagram showing the general concepts of an encoded radio signal detecting system according to the invention.

Referring now to the drawings, FIG. 1 shows the general and fundamental concepts of detection of encoded radio signals according to the invention. An encoded radio signal detecting system includes a amplitude detector for detecting signal amplitude and noise amplitude in a received radio signal independently. An arithmetic circuit receives the outputs of the amplitude detector, respectively indicative of the signal amplitude and the noise amplitude. The arithmetic circuit derives the difference between the signal amplitude and the noise amplitude and derives a threshold value based on the derived difference. The arithmetic circuit thus outputs a threshold indicative signal to one of the input terminals of a comparator which serves as a discriminator. The comparator also receives the received radio signal at the other input terminal. The comparator compares the received radio signal amplitude with the threshold amplitude to detect encoded radio signal. The comparator produces a comparator signal in the form of a binary signal varying between "1" or "0" depending upon the results of the above comparison. Specifically, if the received signal amplitude is higher than or equal to the threshold amplitude, the comparator signal value becomes "1" to indicate that the encoded radio signal is received. Otherwise, the comparator signal amplitude remains "0" to indicate the absence of the encoded radio signal.

Therefore, when the encoded radio signal detecting system according to the present invention is applied to an automotive keyless entry system which utilizes encoded radio signals to operate a vehicle door lock mechanism, a trunk lid opener and so forth, (such a keyless entry system will be described in detail later), the keyless entry system can be activated by the comparator signal of value "1".

Figure 2:
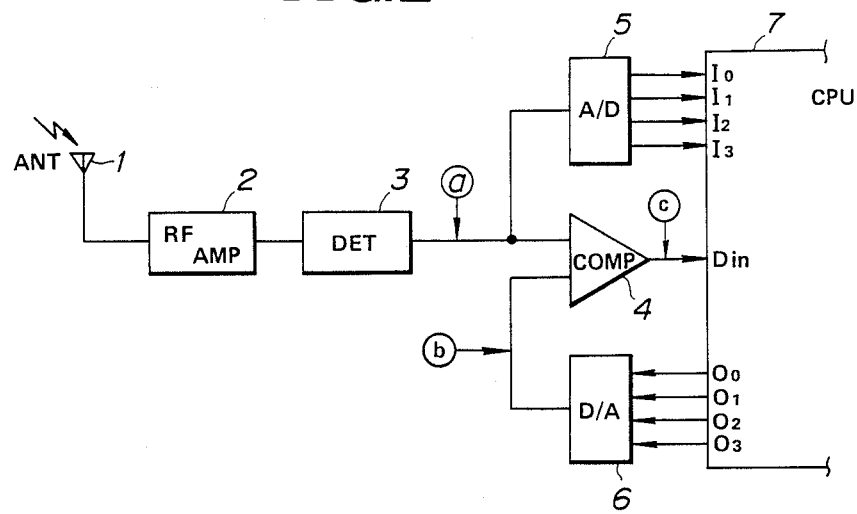
FIG. 2 is a block diagram of the preferred embodiment of the encoded radio signal detecting system according to the invention.

FIG. 2 shows the circuitry of the encoded radio signal detecting system according to the present invention. The system includes an antenna 1, an RF-amplifier 2 and a detector 3 for receiving the encoded radio signal. The signal from the detector, which is RF-amplified by the RF-amplifier 2 first, will be referred to hereafter as "received signal a".

The received signal a is input to one input terminal of a comparator 4. Also, the received signal is input to a CPU 7 of a microprocessor through analog-to-digital (A/D) converter 5 and through the input ports $I_0$, $I_1$, $I_2$ and $I_3$. The CPU 7 derives a threshold amplitude to be compared with the received signal amplitude. In practice, the CPU executes a threshold deriving program shown in FIG. 3 in order to derive the threshold amplitude in response to the input through the input ports $I_0$, $I_1$, $I_2$ and $I_3$. The CPU 7 executes the threshold derivation program at regular intervals.

The CPU 7 outputs the resultant threshold indicative signal through output ports $O_0$, $O_1$, $O_2$ and $O_3$. The output of the CPU 7 is sent to the other input terminal of the comparator 4 through a digital-to-analog (D/A) converter 6 as a threshold indicative analog signal b. The comparator 4 thus compares the amplitudes of the received signal a and the threshold indicative analog signal b. The comparator 4 outputs a comparator signal in the form of HIGH ("1") and LOW ("0") amplitude pulses depending on the results of comparison. Specifically, when the received signal amplitude is higher than the threshold amplitude, the comparator signal amplitude goes HIGH to indicate the presence of the encoded radio signal. On the other hand, if the received signal amplitude is lower than or equal to the threshold indicative signal amplitude, then the comparator signal c is held LOW to indicate the absence of the encoded radio signal. The comparator signal is input to the CPU 7 through an input port Din.

Figure 3:
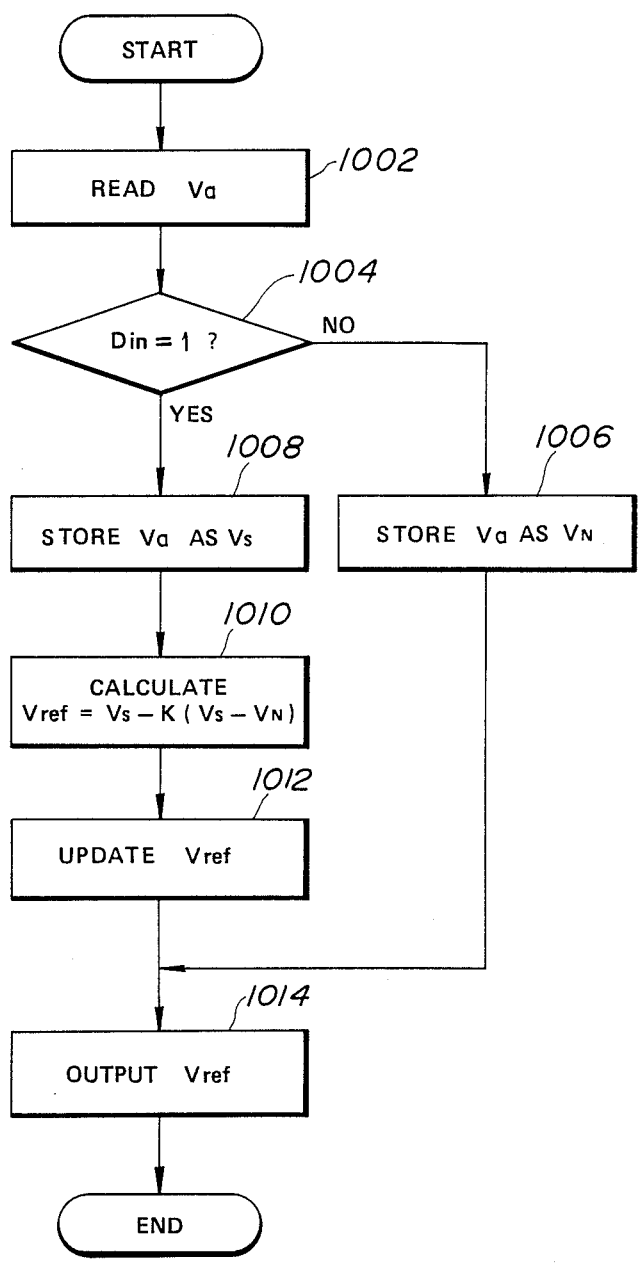
FIG. 3 is a flowchart of a program for deriving a threshold amplitude to be used for detection of the encoded radio signal.

As shown in FIG. 3, during execution of the threshold derivation program, first the input amplitudes at the input ports $I_0$, $I_1$, $I_2$ and $I_3$ which together represent the received signal amplitude $V_a$ are read at a step 1002. The read value $V_a$ is temporarily stored in a register (not shown) in the CPU 7.

Then, the input amplitude at the input port $D_{in}$ is checked at a step 1004 to see whether the input amplitude is HIGH ("1") or not. If the input amplitude at the input port $D_{in}$ is LOW ("0"), control passes to a step 1006, which stores the value $V_a$ as a value $V_N$ representative of noise amplitude while the encoded radio signal is absent. After the step 1006, a previously determined threshold $V_{ref}$ is read out and output at a step 1014.

On the other hand, if the input amplitude at the input port $D_{in}$ is HIGH ("1"), the value $V_a$ is stored as a value $V_S$ representative of the signal amplitude in the presence of the encoded radio signal. Then, the new threshold value $V_{ref}$ is calculated at a step 1010 according to the equation of $$V_{ref} = V_S - K(V_S - V_N)$$

where K is a constant. The new threshold value $V_{ref}$ determined in the step 1010 is used to replace the previous threshold value $V_{ref}$ in a step 1012.

After the step 1012, the threshold value $V_{ref}$ is output through the output ports $O_0$, $O_1$, $O_2$ and $O_3$ in the step 1014. The digital output threshold value $V_{ref}$ is converted to analog by the D/A converter 5 and input to the comparator 4 as the threshold indicative analog signal b.

Figure 4:
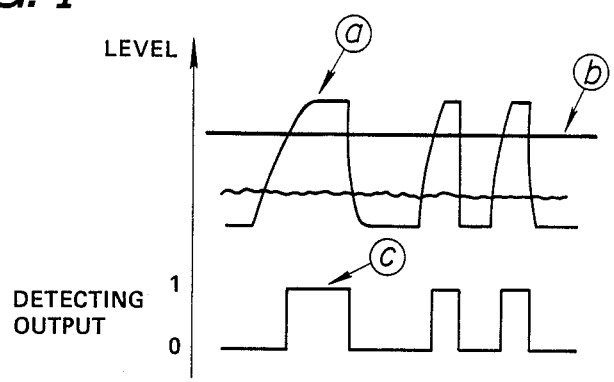
FIGS. 4, 5 and 6 show waveforms of various received signals containing both signal components and noise components, and corresponding outputs of the detecting system.
Figure 5:
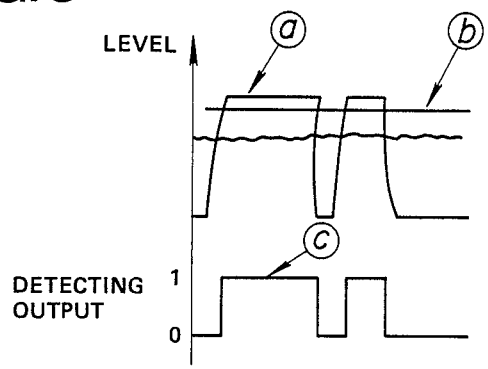
Figure 6:
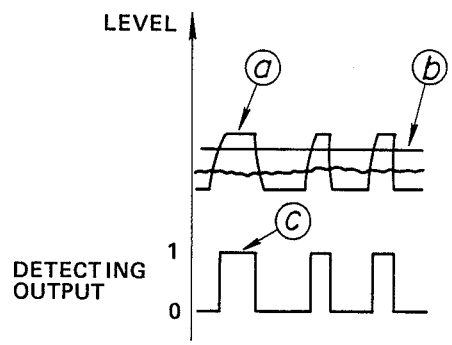

With the aforementioned arrangement, the encoded radio signal can be detected irrespective of the amplitude of the noise component in the received signal, as shown in FIGS. 4 and 5. Furthermore, when the encoded radio signal amplitude is relatively low, the threshold amplitude to be compared with the received signal is lowered accordingly to enable reliable detection of the encoded radio signal, as shown in FIG. 6.

FIGS. 7 to 11(B) show the preferred embodiment of the keyless entry system to which the encoded radio signal detecting system according to the present invention is applied.

Figure 7:
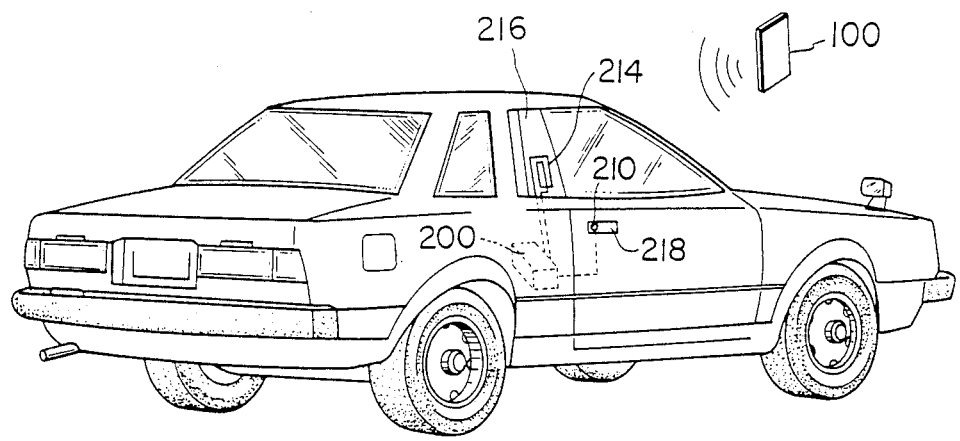
FIG. 7 is a perspective view of an automotive vehicle in which the preferred embodiment of a keyless entry system is installed.

Referring now to the drawings, particularly to FIG. 7, the preferred embodiment of the keyless entry system according to the invention, generally comprises a radio code signal transmitter 100 and a controller 200. The radio code signal transmitter 100 is of generally thin bank- or credit-card-like configuration and is equivalent in size to a bank or credit card. On the other hand, the controller 200 is mounted at an appropriate position within the passenger compartment of an automotive vehicle.

Figure 8:
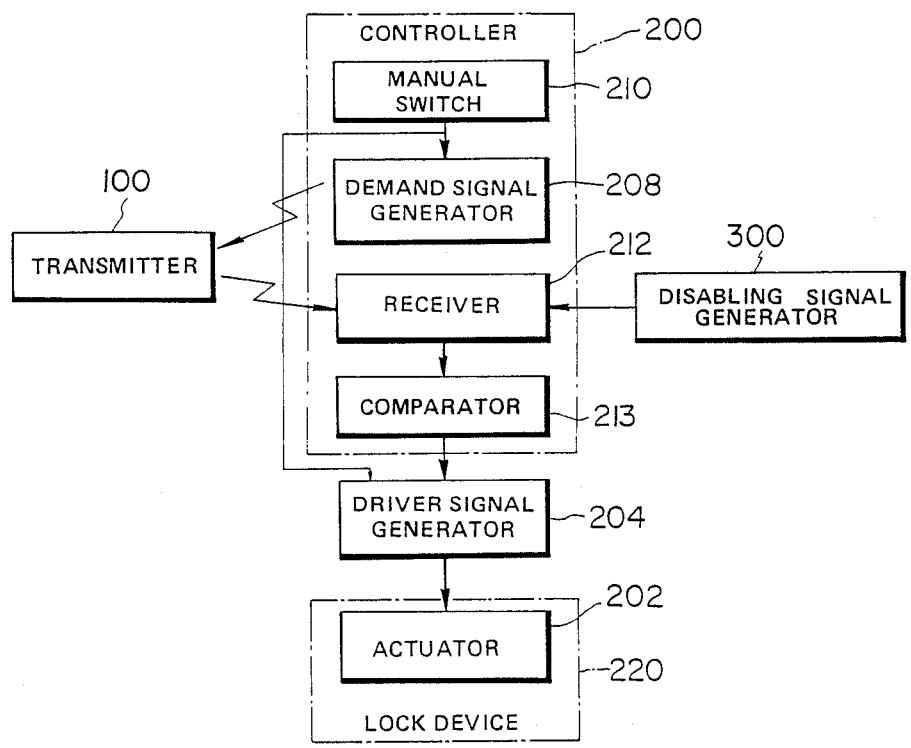
FIG. 8 is a schematic block diagram of the keyless entry system for automotive vehicle devices, such as a door lock mechanism, according to the invention.

As shown in FIGS. 7 and 8, the controller 200 is connected via a driver signal generator 204 to actuators 202 for vehicle devices such as a door lock device, a trunk lid lock device, a glove box lid lock and a steering lock device. The controller 200 is also connected to a disable signal generator 300 which can produce a disable signal to selectably disable the controller. The disable signal generator 300 responds to predetermined conditions by producing the disable signal.

In the shown first embodiment, the disable signal generator 300 detects when an ignition switch 302 is in a position other than the OFF position. For instance, the disable signal generator 300 outputs the disable signal when the ignition switch 302 is in the ACC position, wherein electric power is supplied to electrical accessories in the vehicle, or the IGN position, wherein electric power is supplied to an engine ignition system and to the electrical accessories, or the START position wherein electric power is applied to a starter motor (not shown).

The controller 200 includes a radio demand signal SD generator 208 which sends a radio demand signal SD to the radio code signal transmitter 100 to activate the latter. The radio demand signal SD generator 208 is connected to one or more manual switches 210 which are placed on the external surface of the vehicle so as to be accessible from outside the vehicle. The radio demand signal SD generator 208 produces the radio demand signal SD when one of the manual switches 210 is depressed.

Figure 9:
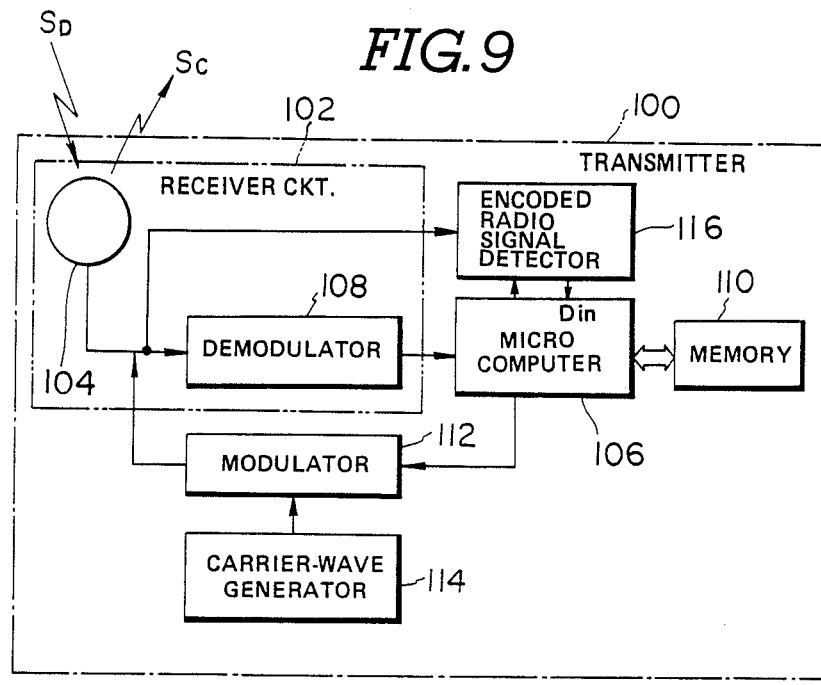
FIG. 9 is a block diagram of a radio code transmitter in the preferred embodiment of the keyless entry system, in which the preferred embodiment of the encoded radio signal detecting system is incorporated.

As shown in FIG. 9, the radio code signal transmitter 100 includes a receiver circuit 102 for receiving the radio demand signal SD from the controller. The radio code signal transmitter 100 becomes active when the receiving circuit 102 receives the radio demand signal SD to produce a radio code signal SC which is indicative of a preset specific code. The preset code of the portable radio code signal transmitter 100 differs from that of the radio demand signal SD generator 208 so that the controller 200 can recognize when the radio code signal transmitter 100 is responding.

The radio code signal transmitter 100 continuously transmits the radio code signal SC to the controller for as long as it remains active. The radio code signal SC is received by a receiver 212 in the controller 200. The controller 200 has a comparator 213 to compare the received code with a specific preset code. When the received code matches the code preset as compared in the comparator 213, the controller 200 sends a control signal SL to the driver circuit generator 204. The driver signal generator 204 in turn sends a drive signal to one of the actuators 202 corresponding to the manual switch 210 operated. The actuator 202 in activated by the driver signal from the driver signal generator 204 to operate the corresponding vehicle device.

It should be appreciated that, since the vehicle devices to be operated by the first embodiment of the keyless entry system are two-state locking devices for locking and unlocking vehicle doors, the trunk lid, the glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which is currently unlocked, that vehicle device is then locked.

The radio code signal transmitter 100 includes a transmitter/receiver antenna 104. In addition, a loop antenna 214 is built into an appropriate position of the vehicle, such as one of the windows 216 of the vehicle or in a side mirror. The loop antenna 214 transmits the radio demand signal SD to and receives the radio code signal SC from the radio code signal transmitter 100. As shown in FIG. 7, the manual switches 210 are mounted on an escutcheon 218 of an outside door handle for operation from outside the vehicle.

FIG. 9 shows the circuit structure of the radio code signal transmitter 100. A microprocessor 106 is connected to the antenna 104 via a demodulator 108 which demodulates the received radio demand signal SD. The microprocessor 106 includes a memory 110 storing the preset code. In response to the radio demand signal SD, the microprocessor 106 reads the preset code out to a modulator 112. The modulator 112 is, in turn, connected to a carrier-wave generator 114 to receive a carrier wave. The modulator 112 modulates the carrier-wave with the code-indicative signal from the microprocessor 106 to produce the final radio code signal SC.

In addition, the radio code signal transmitter 100 includes the aforementioned encoded radio signal detector 116 for detecting the radio demand signal $S_D$. The comparator 4 of the encoded radio signal detector is connected to the $D_{in}$ input terminal of the microprocessor 106.

In the preferred embodiment, the antenna 104 of the radio code signal transmitter 100 is built into the transmitter circuit board or on the surface of a transmitter housing 116. The casing 116 is the size of a name card and thin enough to carry in a shirt pocket. The transmitter 100 uses a long-life, compact battery, such as a mercury battery, as a power source.

Figure 10:
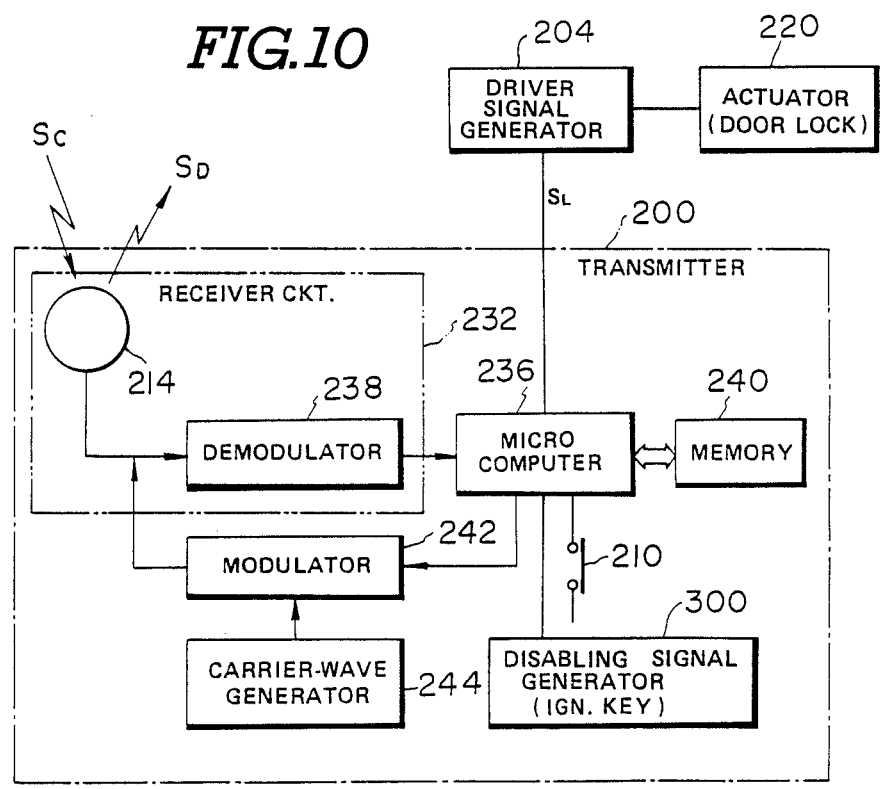
FIG. 10 is a block diagram of a controller in the preferred embodiment of the keyless entry system.
Figure 11:
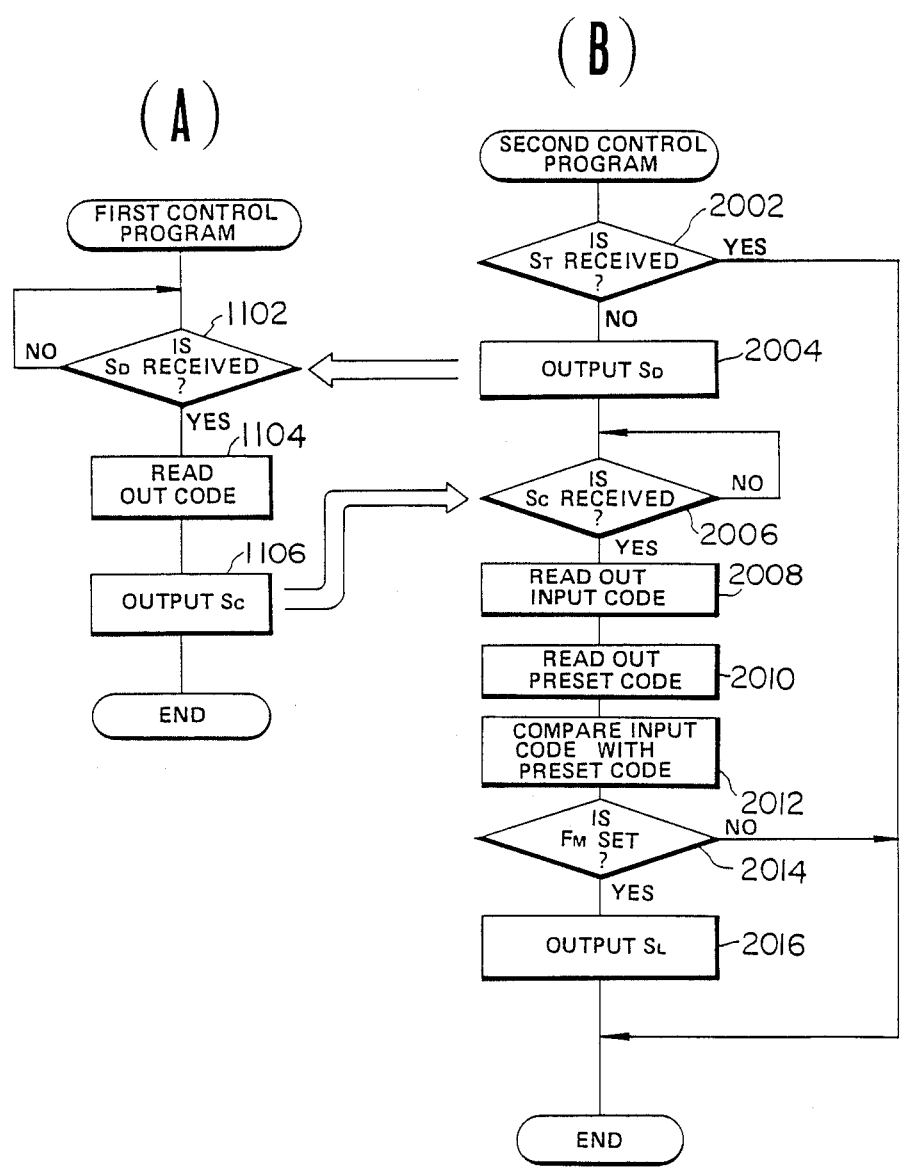
FIGS. 11(A) and 11(B) are cooperative flowcharts of operation of the transmitter of FIG. 9 and the controller of FIG. 10.

FIG. 10 shows the practical circuit structure of the controller 200 which has been disclosed functionally with reference to FIG. 8. As seen from FIG. 10, the controller 200 generally comprises a microprocessor 236 which is connected to the antenna 214 through a demodulator 238, which together constitute a receiver circuit 232 receiving the radio code signal S from the radio code signal transmitter 100. Also, the microprocessor 236 is connected for output to the antenna 214 through a modulator 242. The modulator 242 is also connected to a carrier-wave generator 244 to receive therefrom a carrier wave of a predetermined frequency. The modulator 242 modulates the carrier wave in accordance with a demand indicative signal from the microprocessor and transmits the resulting radio demand signal through the antenna 214.

The microprocessor 236 has internal or external memory 240 such as a programable ROM or the like. Preset codes, one of which corresponds to the demand for activating the radio code signal transmitter 100 and the other of which corresponds to the preset code in the radio code signal transmitter, are stored in the memory 240.

As set forth above, the microprocessor 236 is also connected to a disabling signal generator 300, such as the ignition switch. The microprocessor 236 is disabled in response to the disabling signal from the disabling signal generator when a predetermined disabling factor is detected. Unless disabled by the disabling signal, the microprocessor 236 receives the radio code signal from the radio code signal transmitter 100, compares the received code with the preset code in the memory 240, and outputs the control signal to a driver signal generator 204 for operating the actuator 220.

The operation of the aforementioned embodiment the keyless entry system set forth above will be described in more detail with reference to FIGS. 11(A) and 11(B). The microprocessor 106 of the radio code signal transmitter 100 repeatedly executes the first control program illustrated in FIG. 11(A). In the first control program, the microprocessor 106 checks for receipt of the radio demand signal SD from the controller at a step 1102. So as to check whether the radio demand signal is received or not, the input amplitude at the $D_{in}$ input terminal is checked. The step 1102 is repeated until the radio demand signal SD is received and thus until the HIGH amplitude input at the $D_{in}$ input terminal is detected. In other words, the radio code signal transmitter 100 normally remains in a stand-by state, waiting to produce the radio code signal SC in response to the radio demand signal SD. During this stand-by state, the encoded radio signal detecter 116 is kept active to detect reception of the aforementioned demand signal $S_D$.

When the radio demand signal SD is detected at the step 1002, the preset code is read from the memory 110 at a step 1004. The microprocessor 106 then outputs the preset code-indicative signal to the modulator 112 which, in turn, outputs the radio code signal SC in step 1006. Control then returns to the stand-by step 1102.

It should be noted that the radio code signal SC is transmitted from the modulator to the controller 200 for a given period of time and terminates when the given period of time expires. The given period of time during which the radio code signal SC is transmitted is so chosen that the controller 200 can activate the actuator 202 designated by the operated manual switch 210 before expiration of that period. In addition, the preset code stored in the memory 110 is preferably a binary code, such as an 8-bit serial datum. This binary code rides on the carrier wave as modulated by the modulator to form the radio code signal SC.

FIG. 11(B) is flowchart for the controller 200. At the initial stage of the second control program of FIG. 11(B), the microprocessor 232 checks whether disabling signal $S_T$ is input or not at a step 2002. If the disabling signal $S_T$ is not detected when checked at the step 2002 control passes to a step 2004, in which the modulator 242 is activated to send a radio demand signal SD to the radio code signal transmitter 100 to activate the latter. Thereafter, the controller 200 enters a second stand-by state, waiting for the radio code signal SC. Specifically, a step 2006 is repeated for a fixed period of time as a loop until the radio code signal SC is received. After the radio code signal SC is input via the antenna 214 and the demodulator 230, the received code in the radio code signal SC is read out at a step 2008. The preset code of the controller 200 is then read out from the memory 236, at a step 2010. The input code and the preset code read out in steps 2008 and 2010 are compared at a step 2012. If the codes match, a matching flag FM is set at the step 2012. The matching flag FM is checked at a step 2014. If the matching flag FM is not set, the program returns to step 2002. On the other hand, if the matching flag FM is set when checked at the step 2014, then the control signal SL is sent to the driver signal generator at a step 2016.

In this embodiment as set forth above, since the radio code signal SC is output only when the demand signal DS is input from the controller, consumption of electric power of the battery in the transmitter is significantly reduced in comparison with system which might employ constant transmission of the radio code signal SC. Thus, the life-time of the battery of the transmitter is prolonged even though electric power is constantly supplied to the microprocessor to hold same in standby. It should be appreciated that the electric power needed to power the microprocessor is substantially smaller than that consumed in transmitting the radio code signal SC. Therefore, constant power supply to the microprocessor will not significantly affect the lifetime of the battery.

It should be also appreciated that the control signal $S_L$ serves to actuate the associated vehicle device to the desired position. For instance, when the vehicle device to be operated is the door lock device, the position of the door lock device is reversed between its locked and unlocked positions each time the control signal $S_L$ is generated. Therefore, in the step 2016, the control signal $S_L$ for reversing the door lock device position is output when the manual switch 210 associated with the door lock device is manually depressed.

As will be appreciated herefrom, the encoded radio signal detecting system according to the present invention ensures activation of the radio code signal transmitter 100 in response to the radio demand signal even when the noise amplitude is rather high and/or the amplitude of the encoded radio signal is relatively low.

It should be appreciated that application of the encoded radio signal detecting system for a automotive keyless entry system as disclosed hereabove is to be understood as a mere example of the application of the present invention. The encoded radio signal detecting system can be used in various radio signal transmission systems which require detection of a radio signal.

Therefore, the invention fulfills all of the objects and advantages sought therefor.

What is claimed is:

1. An encoded radio signal detecting system comprising:
   first means for receiving an encoded radio signal and producing an analog signal having a signal amplitude varying with the amplitude of the received signal;
   second means for detecting the amplitudes of a signal component and of a noise component in said analog signal and deriving the difference between the amplitudes of said signal component and said noise component;
   third means for deriving a threshold amplitude based on said difference and outputting a threshold indicative signal; and
   fourth means for comparing said analog signal value with said threshold indicative signal value to detect the presence and absence of said encoded radio signal.

2. An encoded radio signal detecting system as set forth in claim 1, wherein said third means holds said analog signal value while the encoded radio signal is absent as a noise component indicative signal value and holds said analog signal value while radio signal is present as a signal component indicative value for use in deriving said difference.

3. An encoded radio signal detecting system as set forth in claim 2, wherein said threshold amplitude is derived to be less than said signal component indicative signal value by an amount proportional to said difference.

4. An encoded radio signal detecting system as set forth in claim 2, wherein said fourth means cooperates with said third means to output a signal indicative of the absence or presence of said encoded radio signal, and said third means is responsive to a absense indicative output from said fourth means for holding said analog signal value as said noise component indicative signal and to a presence indicative output to derive and output the threshold value based on the previously held noise component indicative signal and the currently held signal component indicative signal.

5. A method for detecting an encoded radio signal comprising the steps of:
   receiving radio signals and generating an analog signal having a value varying with the amplitude of the received radio signal;
   detecting the signal-component amplitude and the noise-component amplitude in the received signal and deriving the difference between said signal-component and noise-component amplitudes;
   deriving a threshold value based on said difference between said signal-component and said noise-component amplitudes; and
   comparing said analog signal value with said threshold value in order to detect the presence and absence of said encoded radio signal and producing a binary signal varying between HIGH and LOW values depending upon the presence and absence of the encoded radio signal.

6. A method as set forth in claim 5, wherein said signal-component amplitude and said noise-component amplitude detecting step is performed by holding said noise-component amplitude while said binary signal representative of the absence of said encoded radio signal is output and holding said signal-component amplitude while said binary signal representative of the presence of said encoded radio signal is output.

7. A method as set forth in claim 6, wherein said threshold value is determined to be less than said signal-component amplitude by a variable amount varying in proportion to the difference between said signal-component amplitude and said noise-component amplitude.

8. A keyless entry system for an automotive vehicle device for actuating the vehicle device, comprising:
   an electrical actuator connected to said vehicle device and responsive to a control signal to operate said vehicle device to a position ordered by said control signal;
   a manual switch;

a transmitter transmitting a radio code signal indicative of a unique code which identifies said transmitter;

a detector incorporated in said radio code signal transmitter for detecting a radio demand signal for activating said transmitter to transmit said radio code signal, said detector comparing a received signal with a predetermined threshold which varies with the difference between the signal-component amplitude and the noise-component amplitude in the received signals and outputting an activation signal for activating said radio signal transmitter when the received signal amplitude is higher than said threshold amplitude; and a controller responsive to manual operation of said manual switch to generate a radio demand signal to activate said transmitter, to transmit said radio demand signal to said transmitter, to receive said unique code indicative radio code signal from said transmitter, to compare said unique code with a preset code, and to generate said control signal when said unique code matches said preset code.

9. An encoded radio signal detecting system as set forth in claim 1, further including:

fifth means, responsive to said fourth means, for holding said analog signal as said signal component when said fourth means detects presence of said encoded radio signal and holding said analog signal as said noise component when said fourth means detects absence of said encoded radio signal.

10. A method as set forth in claim 5, further comprising the step of:

holding said analog signal as said signal component in response to said HIGH level binary signal and holding said analog signal as said noise component in response to said LOW level binary signal.

11. A keyless entry system as set forth in claim 8, wherein said detector converts said radio code signal into an analog signal having a signal level variable depending upon the amplitude of the received radio code signal, holding said analog signal value as a signalcomponent amplitude indicative first signal when the presence of said radio code signal is detected, holding said analog signal value as a noise-component indicative second signal when the absence of said radio code signal is detected, deriving a difference between said first and second signal values, and varying said threshold value depending upon said difference.

12. An encoded radio signal detecting system comprising:

a signal receiver means, for receiving an encoded radio signal producing an analog signal having a signal amplitude varying with the amplitude of the received signal;

a detector means for comparing said analog signal value with a given threshold value to detect the presence and absence of said encoded radio signal, said detector means producing a detector signal having a first level when the presence of said encoded radio signal is detected and a second level when the absence of said encoded radio signal is detected;

a first signal holding means, responsive to said first level detector signal for holding said analog signal value as a first value;

a second signal holding means, responsive to said second level detector signal, for holding said analog signal value as a second value; and a threshold value derivation means, operative for deriving said given threshold value for a next cycle, said threshold value derivation means reading out said first and second values for comparing to derive a difference therebetween, and deriving said given threshold value on the basis of said difference.

13. An encoded radio signal detecting system comprising:

a signal receiver means, for receiving an encoded radio signal producing an analog signal having a signal amplitude varying with the amplitude of the received signal;

a detector means for comparing said analog signal value with a given threshold value to detect the presence and absence of said encoded radio signal, said detector means producing a detector signal having a first level detected and a second level when the absence of said encoded radio signal is detected;

a first signal holding means for holding said analog signal value as a first value, said first signal holding means being responsive to said first level detector signal for updating said first value with the value of said analog signal;

a second signal holding means for holding said analog signal value as a second value, said second signal holding means being responsive to said second level detector signal for updating said second value with the value of said analog signal: and a threshold value derivation means for deriving said given threshold value, said threshold value derivation means reading out said first and second values for comparing to derive a difference therebetween, and deriving said given threshold value on the basis of said difference.

* * * * *